(12) United States Patent
Sutton

(10) Patent No.: US 10,043,179 B2
(45) Date of Patent: Aug. 7, 2018

(54) TECHNIQUES FOR PROVIDING VOUCHERS

(71) Applicant: NCR Corporation, Duluth, GA (US)

(72) Inventor: Robert Sutton, Cumming, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/470,460

(22) Filed: Aug. 27, 2014

(65) Prior Publication Data

US 2016/0063489 A1 Mar. 3, 2016

(51) Int. Cl.
*G06F 17/00* (2006.01)
*G06Q 20/38* (2012.01)
*G06Q 20/20* (2012.01)
*G06Q 20/18* (2012.01)

(52) U.S. Cl.
CPC .......... *G06Q 20/387* (2013.01); *G06Q 20/18* (2013.01); *G06Q 20/204* (2013.01)

(58) Field of Classification Search
CPC .... G06Q 20/18; G06Q 20/204; G06Q 20/387; G06Q 30/0207; G06Q 30/0224; G06Q 30/0226; G06Q 30/0227; G06Q 30/0231–30/0237
USPC ........................................ 235/375, 379, 384
See application file for complete search history.

(56) References Cited

U.S. PATENT DOCUMENTS

| | | | | |
|---|---|---|---|---|
| 8,050,950 | B2 * | 11/2011 | Sethna | G06Q 10/02 705/5 |
| 8,275,641 | B2 * | 9/2012 | Sethna | G06Q 10/02 705/37 |
| 2002/0100803 | A1 * | 8/2002 | Sehr | 235/384 |
| 2003/0225600 | A1 * | 12/2003 | Slivka | G06Q 10/047 705/5 |
| 2005/0125266 | A1 * | 6/2005 | Bramnick | G06Q 10/02 705/5 |
| 2010/0223118 | A1 * | 9/2010 | Postrel | G06Q 20/105 705/14.24 |
| 2014/0244374 | A1 * | 8/2014 | Morris | G06Q 30/0225 705/14.26 |
| 2014/0289111 | A1 * | 9/2014 | Doran | G06Q 20/10 705/41 |

* cited by examiner

*Primary Examiner* — Thien M Le
*Assistant Examiner* — April Taylor
(74) *Attorney, Agent, or Firm* — Schwegman, Lundberg & Woessner

(57) ABSTRACT

Techniques for providing vouchers to customers which automates voucher delivery and frees up agent time that would otherwise be spent interacting with customers to manually complete voucher forms. An example method includes determining eligibility of a customer to receive a voucher by a self-service computer, determining an amount of the voucher by the self-service computer, storing the amount in a payment card by the self-service computer, and dispensing the payment card to the customer by the self-service computer.

14 Claims, 2 Drawing Sheets

TECHNIQUES FOR PROVIDING VOUCHERS

BACKGROUND

The present invention relates to voucher payment systems, and more specifically to techniques for providing vouchers to customers.

Vouchers are commonly used to fulfill a variety of obligations. For example, in the travel industry, vouchers are used to compensate customers for certain inconveniences and to maintain customer goodwill. An airline may issue a voucher during an oversold situation to a customer who has been involuntarily denied boarding or who has volunteered to give up a seat. Airlines may also offer vouchers when flights are significantly delayed or cancelled.

Today, vouchers are often issued manually, in handwritten or printed form. Some paper documents have to be retained for audit purposes. When vouchers are used in transactions, merchants must manually enter payment numbers from the vouchers. Voucher processes are very manual and require a lot of time and effort to reconcile.

It would be desirable to provide an alternative method of providing vouchers to customers.

SUMMARY

In accordance with the teachings of the present invention, techniques for providing vouchers are provided.

An example method includes determining eligibility of a customer to receive a voucher by a self-service computer, determining an amount of the voucher by the self-service computer, storing the amount in a payment card by the self-service computer, and dispensing the payment card to the customer by the self-service computer.

DETAILED DESCRIPTION

Figure 1:
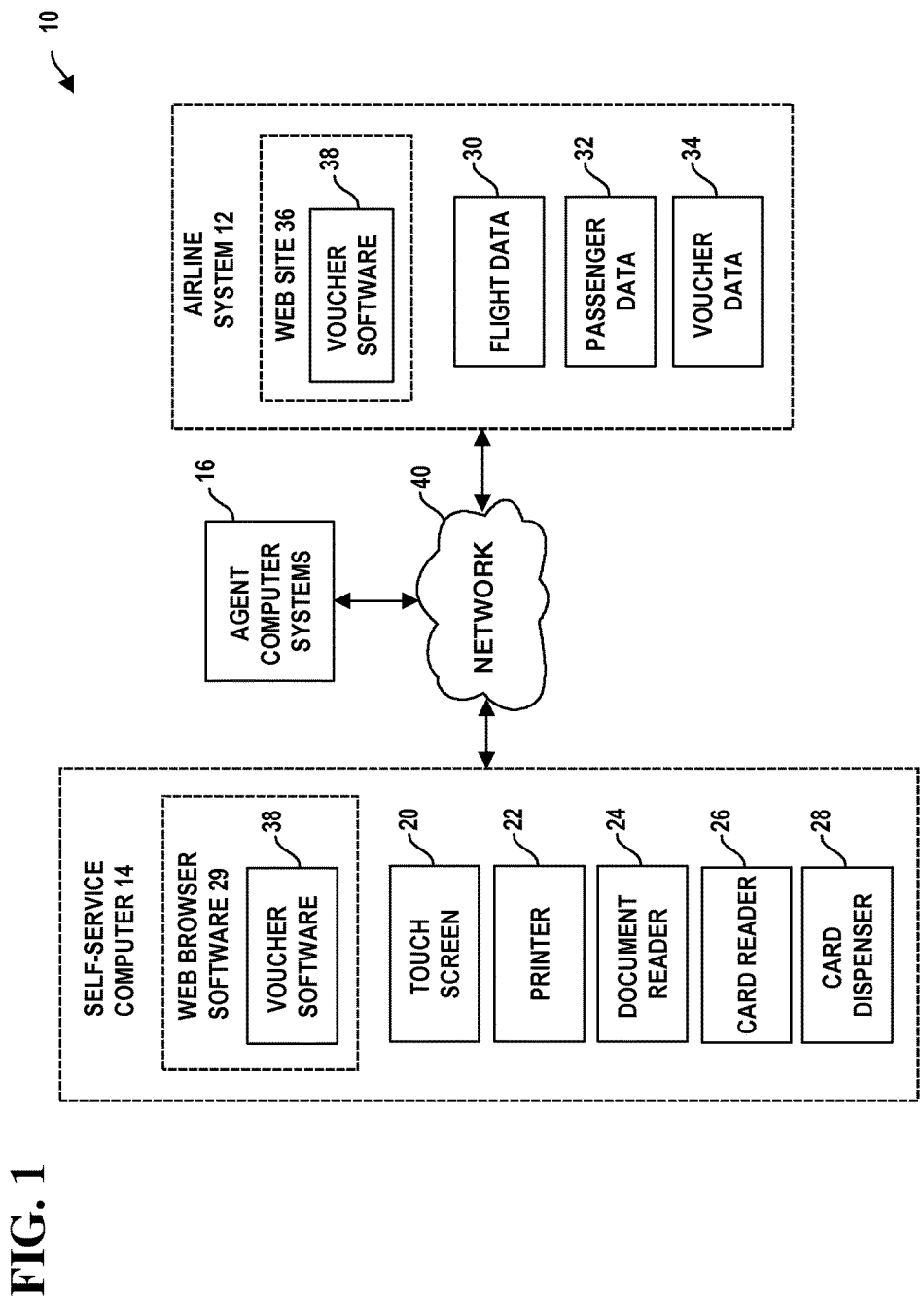
FIG. 1 is a block diagram of an example travel system.

Turning now to FIG. 1, travel system 10 is illustrated in an air travel example. Other types of voucher systems are also envisioned.

Example travel system 10 primarily includes one or more airline systems 12. Airline system 12 includes one or more servers including one or more processors, memory, and program and data storage. Airline system 12 may execute an operating system such as a Microsoft or Linux operating system. Airline system 12 further includes network circuitry for connecting to network 40, and may include other circuitry for connecting to peripherals, such as a display, a printer, a mouse, and a keyboard.

Network 40 may include any combination of wireless or wired networks, including local area, wide area, virtual private, and global communication networks, such as the Internet.

Airline system 12 maintains one or more databases containing flight data 30 and passenger data 32. Flight data 30 may include information about each scheduled flight. Passenger data 32 may include passenger identification information and other information associated with the passenger identification information, including travel document information. Travel documents may include passports or visas issued by government authorities, or other required travel documents. Travel document information may include passenger nationality, travel document number, travel document expiration, travel document issuing authority, or other required information. Airline system 12 may also include third part host computers that store and manage some of the flight data 30 and passenger data 32 in a Departure Control System (DCS) for an airline.

Airline system 12 may be connected to the World Wide Web (web) and include a web server which hosts a web site 36 including web pages, web applications and other web content. Customers may visit web site 36 to make or change reservations and to check-in for flights.

Passengers affected by involuntary denial of boarding, flight delays, and flight cancellations may also visit web site 36 using self-service computer 14 to obtain vouchers. For this purpose, web site 36 may include or provide voucher software 38.

In one example, voucher software 38 may be written in a programming language such as the Java or C-Sharp programming language and be hosted within browser software.

As another example, voucher software 38 may include a script, written in a scripting language such as JavaScript, combined with hypertext markup language (HTML) or other suitable web page language and hosted within browser software.

Passengers use self-service computer 14 to obtain vouchers. In one example, self-service computer 14 may include a kiosk located at an airport location, such as an airport gate. Self-service computer 14 connects to airline system 12 through network 40 for downloading web pages and voucher software 38 from web site 36.

Self-service computer 14 may be configured for a voucher program of a single airline, or for voucher programs of multiple airlines, where each airline has its own accessible web page for processing voucher requests.

Self-service computer 14 includes one or more processors, memory, and program and data storage. Self-service computer 14 may execute an operating system such as a Microsoft or other operating system. Self-service computer 14 may execute other computer software, which may be stored in a computer readable medium, and which include web browser software 29 to display web pages from airline system 12 and voucher software 38.

Self-service computer 14 further includes wired or wireless network circuitry for connecting to airline system 12 through network 40, and may include other circuitry for connecting to peripherals, such as a touch screen 20, a printer 22, one or more document readers 24 (such as a barcode reader) for reading travel documents (i.e. boarding passes—paper and electronic, passports, machine readable visas or other government issued documents), a card reader 26 for reading customer payment and loyalty cards, and a card dispenser 28 for issuing a pre-loaded payment card, such as a pre-loaded debit or credit card. For example, self-service computer 14 may communicate with printer 22, document reader 24, card reader 16, and card dispenser 28 using Universal Serial Bus (USB) standard circuitry.

In one example voucher method, voucher software 38 receives identifying information from a customer and verifies the identifying information against passenger data 32 and/or flight data 30, including verifying that the customer is eligible to receive a voucher. Example identifying information may include a confirmation number, a name, and/or a flight number.

Voucher software 38 may receive the identifying information from any of a variety of example devices. For example, voucher software 38 may receive the identifying information entered by the customer using touch screen 20.

As another example, voucher software 38 may receive the identifying information from a barcode on a boarding pass or from a chip or machine readable zone of a passport or visa using document reader 24.

As another example, voucher software 38 may receive the identifying information from a loyalty or credit card using card reader 26.

If voucher software 38 determines that the customer is eligible to receive a voucher, voucher software 38 determines the amount of the voucher.

In one example, voucher software 38 determines the amount to be a pre-authorized amount from voucher data 34.

In another example, voucher software 38 calculates an amount or modifies a pre-authorized amount based upon predetermined rules/criteria in voucher data 34, which may factor in customer status (e.g., frequent flyer status), class of service or price paid (e.g., first class, business, coach), type and severity of the reason for the voucher (e.g., involuntary denial of boarding, delay, or cancellation), or other criteria or a combination of criteria.

In another example, the rules/criteria above may be used to determine which of a plurality of pre-authorized amounts to award, instead of calculating an award. For example, a first class customer may receive a different voucher pre-authorized amount than a coach customer. Other voucher amount determining methods are also envisioned.

After determining the amount of the award, voucher software 38 may display a notice of any airline obligations and a voucher acceptance form containing terms of the voucher. Voucher software 38 prompts the customer to enter an electronic signature. The electronic signature may be a signature applied via a stylus or finger, the customer's typed name, or other entry signifying the customer's agreement with the terms of the voucher. Voucher software 38 captures the electronic signature and stores signed forms, for example, in passenger data 32 and/or voucher data 34.

Following customer acceptance of the terms of the voucher, voucher software 38 loads the determined voucher amount on a payment card and causes card dispenser 28 to dispense the payment card.

It is envisioned that airlines may offer different types of vouchers and the criteria, voucher amounts, and procedures may vary among airlines. For example, an airline may issue a voucher that may only be used at hotels, restaurants, transportation providers, and/or merchants that have agreements with the airline for accepting such payment cards. Dispensed payment cards may be pre-printed with this information. Alternatively, or in addition, this information may be displayed as part of the terms of the voucher acceptance form.

Example travel system 10 further includes agent computer systems 16 at terminal check-in and/or gate locations. In addition to other check-in functions, agent computer systems 16 may assist agents in making decisions regarding which airline customers will receive vouchers. Agents may enter these decisions in passenger data 32 and/or voucher data 34.

Agent computer systems 16 each include one or more processors, memory, and program and data storage. Agent computer systems 16 may execute an operating system such as a Microsoft or other operating system. Agent computer systems 16 further include wired or wireless network circuitry for connecting to network 40, and may include other circuitry for connecting to peripherals, such as a touch screen or display, keyboard, and mouse.

Figure 2:
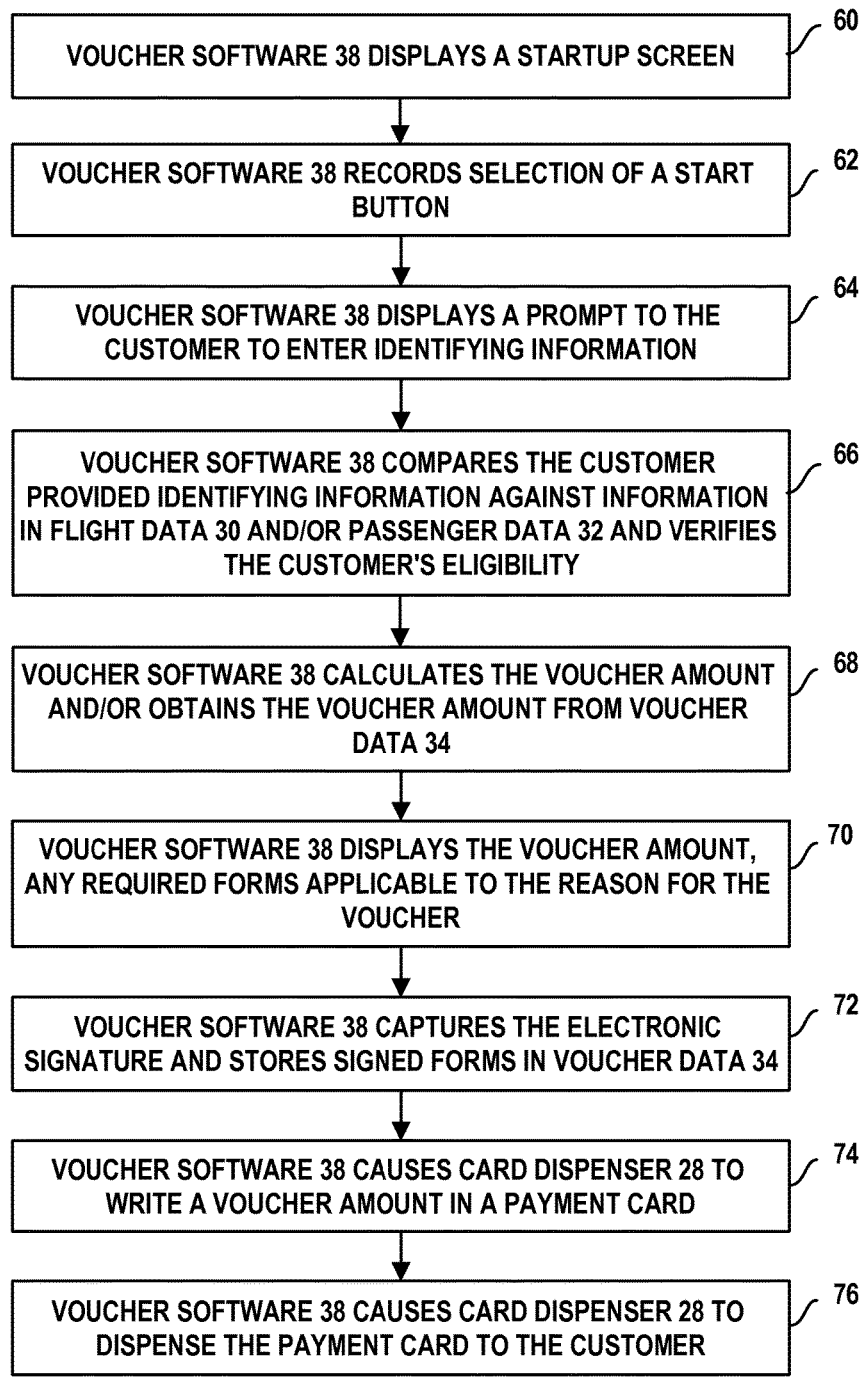
FIG. 2 is a flow diagram illustrating an example voucher method.

With reference to FIG. 2, an example voucher method is illustrated beginning with step 60. The example method facilitates self-service processing of vouchers to eligible customers for various reasons, such as oversold conditions, flight cancellations, and excessive flight delays.

In step 60, voucher software 38 displays a startup screen or home page with selection buttons within web browser software 29 to begin a voucher request by an airline customer using self-service computer 14. If self-service computer 14 processes voucher requests for multiple airlines, the startup screen may include a list of airlines which the customer must choose from before beginning a voucher request with a particular airline.

In step 62, voucher software 38 records selection of a start button by the airline customer.

In step 64, voucher software 38 displays a prompt to the customer to enter information identifying the airline customer. Example identifying information may include a confirmation number, a name, and/or a flight number. The customer may enter identifying information through one or more peripherals of self-service computer 14.

In one example embodiment, the customer enters the identifying information using touch screen 20. For example, voucher software 38 may display one or both of a keyboard and drop down list for entering or selecting a flight number, a date, and a customer name using touch screen 20.

In another example embodiment, the customer enters the identifying information using document reader 24. For example, voucher software 38 may display options for documents and a prompt to place an identifying document in position for reading by document reader 24, which may include one or more different types of document reading devices.

If the customer chooses to scan a barcode on a boarding pass previously issued to the customer, then the customer places the boarding pass adjacent document reader 24 for reading barcodes. The boarding pass may include a printed boarding pass or an e-boarding pass stored within a mobile communication device of the customer. Voucher software 38 obtains a customer name, flight number, date and other information helpful to the airline from the barcode in the boarding pass through document reader 24.

If the customer chooses to read printed and/or electronic identifying information from a customer passport, then the customer places the passport in a position to be read by a document reader 24 for reading passport information. Voucher software 38 obtains a customer name from the machine readable zone of the passport or a chip in the passport through document reader 24.

In another example embodiment, the customer enters the identifying information using card reader 26. For example, voucher software 38 may display a prompt to swipe a loyalty or payment card. Voucher software 38 obtains a customer name from the card through card reader 26.

In step 66, voucher software 38 compares the customer provided identifying information against information in flight data 30 and/or passenger data 32 for eligibility information, for example, that an agent has previously entered the customer's eligibility in the customer's record in passenger data 32.

In step 68, voucher software 38 calculates the voucher amount and/or obtains the voucher amount from voucher data 34. For example, voucher software 38 may calculate an amount or modify a preauthorized amount based upon predetermined rules/criteria in voucher data 34, which may factor in customer status (e.g., frequent flyer status), class of service or price paid (e.g., first class, business, coach), type and severity of the reason for the voucher (e.g., involuntary denial of boarding, delay, or cancellation), or other criteria or a combination of criteria. As another example, voucher software 38 may use the rules/criteria above to determine which of a plurality of pre-authorized amounts to award.

In step 70, voucher software 38 displays the voucher amount, any required forms applicable to the reason for the voucher, such as a notice of airline obligations, and the terms of a compensation award offered to the customer, including limitations associated with use of the voucher, and prompts the customer to enter an electronic signature. Limitations associated with use may include use only at hotels, restaurants, transportation providers, and/or merchants that have agreements with the airline.

The electronic signature may be a signature applied via a stylus, a finger, the customer's typed name, or other entry signifying the customer's agreement with the terms of the compensation award.

In step 72, voucher software 38 captures the electronic signature and stores signed forms in voucher data 34.

In step 74, voucher software 38 causes card dispenser 28 to store a voucher amount in a payment card. Voucher software 38 may also store a link to an acquiring bank or credit card company to handle the processing of customer transactions using the payment card.

In step 76, voucher software 38 causes card dispenser 28 to dispense the payment card to the customer.

Voucher software 38 may additionally display selections for printing a receipt, any of the required forms, instructions for use, and/or limitations on use of the payment card.

Advantageously, the voucher method automates voucher delivery and frees up agent time that would otherwise be spent interacting with customers to manually complete voucher forms.

Although the present invention has been described with particular reference to certain preferred embodiments thereof, variations and modifications of the present invention can be effected within the spirit and scope of the following claims.

What is claimed is:

1. A method of providing a voucher comprising:
   configuring a self-service computer for processing voucher programs of multiple airlines, each airline administering that airline's voucher program through a unique web page;
   downloading each airline's web page on the self-service computer;
   integrating a script callable from each downloaded airline's web page on the self-service computer, the script processing within a web browser on the self-service computer;
   displaying a home page within the web browser for a selection of one of a plurality of airlines on the self-service computer;
   determining the selection of an airline based on interaction with a customer at the self-service computer;
   loading that airline's downloaded web page within the web browser and initiating the script for further interaction with the customer at the self-service computer;
   determining eligibility of the customer to receive a voucher by the script computer through interaction with a Departure Control System (DCS) of the airline and with the customer operating the self-service computer through a bar code reader, a card reader, a passport reader, a touchscreen, a printer, a stylus for receiving a signature of the customer, and a payment card dispenser, wherein determining further includes determining eligibility, by the script, for awarding the voucher based at least in part on one or more of: oversold conditions by the airline, flight cancelations, and excessive flight delays and obtained from the DCS as defined by that airline's voucher program;
   determining an amount of the voucher by the script, wherein determining further includes modifying the amount based of factors relevant to a travel situation of the customer and the airline that is providing the voucher as a travel voucher to the customer in response to the travel situation of the customer, and wherein determining further includes determining compensation terms for compensating and awarding the amount to the customer;
   storing, by the script, the amount in a payment card by the self-service computer; and
   dispensing the payment card to the customer by the self-service computer through the payment card dispenser of the self-service computer based on direction provided by the script, wherein dispensing further includes dispensing the payment card as a pre-loaded payment card having the amount and having pre-printed information for restrictions on usages of the pre-loaded payment card, and wherein dispensing further comprising including with the pre-printed information providers where the payment card can be used by the customer.

2. The method of claim 1, wherein determining eligibility comprises:
   obtaining information identifying the customer by the self-service computer; and
   obtaining eligibility information from a record associated with the customer by the self-service computer.

3. The method of claim 2, wherein determining eligibility comprises:
   obtaining information identifying the customer from a touch screen of the self-service computer.

4. The method of claim 2, wherein determining eligibility comprises:
   obtaining information identifying the customer from a card of the customer via the card reader of the self-service computer.

5. The method of claim 2, wherein determining eligibility comprises:
   obtaining information identifying the customer from a passport of the customer via the passport reader of the self-service computer.

6. The method of claim 2, wherein determining eligibility comprises:
   obtaining information identifying the customer from a barcode via the barcode reader of the self-service computer.

7. The method of claim 1, wherein determining the amount comprises:
   determining a pre-authorized amount from a record associated with the customer.

8. The method of claim 1, wherein determining the amount comprises:
   determining the amount based upon one or more of customer status;
   class of service; and
   reason for the voucher.

9. The method of claim 1, further comprising:
   displaying terms of the voucher to the customer by the self-service computer;
   recording an electronic signature of the customer by the self-service computer; and storing the terms and the electronic signature in a data store by the self-service computer.

10. A method of providing a voucher to a customer comprising:

configuring a self-service computer for processing voucher programs of multiple airlines, each airline administering that airline's voucher program through a unique web page;

downloading access to each airline's web page on the self-service computer, integrating a script callable from each downloaded airline's web page on the self-service computer, the script processing within a web browser on the self-service computer, obtaining information identifying the customer by the self-service computer through interaction by the customer with: a bar code reader, a card reader, a passport reader, a payment card dispenser, a touchscreen, a stylus for receiving a signature of the customer, and a printer of the self-service computer;

identifying an airline based on the information identifying of the customer;

loading that airline's downloaded web page within the web browser and initiating the script for further interaction with the customer;

obtaining eligibility information, by the script, from a record associated with the customer through interaction with a Departure Control System (DCS) of the airline, wherein obtaining further includes determining eligibility for awarding the voucher based at least in part on one or more of: oversold conditions by the airline, flight cancelations, and excessive flight delays and obtained from the DCS as defined by that airline's voucher program;

determining, by the script, an amount of the voucher, wherein determining further includes modifying the amount based of factors relevant to a travel situation of the customer and the airline that is providing the voucher as a travel voucher to the customer in response to the travel situation of the customer, wherein determining further includes determining compensation terms for compensating and awarding the amount to the customer as defined by that airline's voucher program;

displaying, by the script, terms of the voucher to the customer on a display of by the self-service computer;

recording, by the script, an electronic signature of the customer;

storing, by the script, the terms and the electronic signature in a data store on the self-service computer;

storing, by the script, the amount in a payment card available from by the self-service computer; and dispensing the payment card to the customer by the self-service computer through the payment card dispenser of the self-service computer based on direction provided by the script, wherein dispensing further includes dispensing the payment card as a pre-loaded payment card having the amount and having pre-printed information for restrictions on usages of the pre-loaded payment card, and wherein dispensing further comprising including with the pre-printed information providers where the payment card can be used by the customer.

11. A self-service computer comprising:
a display;
an input device;
at least one processor; and
at least one memory comprising computer program code, the at least one memory and the computer program code configured to, with the at least one processor, cause the self-service computer to:

configure the self-service computer for processing voucher programs of multiple airlines, each airline administering that airline's voucher program through a unique web page;

download access to each airline's web page on the self-service computer;

integrate a script callable from each downloaded airline's web page on the self-service computer, the script processes within a web browser on the self-service computer receive identifying information from a customer via the input device, wherein the input device is one of a plurality of devices of the self-service computer that includes: a passport reader, a bar code reader, a touchscreen, a payment card dispenser, a stylus for receiving a signature of the customer, and a printer;

identify an airline based on the identifying information of the customer;

load that airline's downloaded web page within the web browser and initiating the script for further interaction with the customer at the self-service computer;

determine, by the script, that the customer is eligible for a voucher from a record associated with the customer using the identifying information along with interaction to a Departure Control System (DCS) of the airline and determine eligibility to award the voucher based at least in part on one or more of: oversold conditions by the airline, flight cancelations, and excessive flight delays and obtained from the DCS based on that airline's voucher program;

obtain, by the script, a voucher amount from the record and modify the voucher amount based of factors relevant to a travel situation of the customer and the airline that is providing the voucher as a travel voucher to the customer in response to the travel situation of the customer, and determine compensation terms to compensate and award the amount to the customer based on that airline's voucher program;

display, by the script, terms of the voucher to the customer on the display of the self-service computer;

record, by the script, an electronic signature of the customer indicating acceptance of the terms of the voucher;

store, by the script, the terms and the electronic signature in a data store;

store, by the script, the amount in a payment card available from the self-service computer; and dispense the payment card to the customer through the payment card dispenser of the self-service computer based on interaction with the script, wherein dispensing further includes dispensing the payment card as a pre-loaded payment card having the amount and having pre-printed information for restrictions on usages of the pre-loaded payment card, and wherein dispense further comprises including with the pre-printed information providers where the payment card can be used by the customer.

12. The self-service computer of claim 11, wherein the input device comprises the card reader for reading a customer card containing the identifying information.

13. The self-service computer of claim 11, wherein the input device comprises the barcode reader for reading a barcode on a customer document containing the identifying information.

14. The self-service computer of claim 11, wherein the input device comprises the passport reader for obtaining the identifying information from a passport of the customer.

* * * * *